US012799337B2

(12) United States Patent
Kittle et al.

(10) Patent No.: US 12,799,337 B2
(45) **Date of Patent: *Nov. 17, 2026**

(54) ONE-COMPONENT POWDER COATING COMPOSITION AND SUBSTRATE COATED WITH SUCH POWDER COATING COMPOSITION

(71) Applicant: Akzo Nobel Coatings International B.V., Amsterdam (NL)

(72) Inventors: Kevin Jeffrey Kittle, Amsterdam (NL); Maria Jose Gonzalez Alvarez, Amsterdam (NL)

(73) Assignee: Akzo Nobel Coatings International B.V., Amsterdam (NL)

( * ) Notice: Subject to any disclaimer, the term of this patent is extended or adjusted under 35 U.S.C. 154(b) by 614 days.

This patent is subject to a terminal disclaimer.

(21) Appl. No.: 17/928,796

(22) PCT Filed: Jun. 1, 2021

(86) PCT No.: PCT/EP2021/064602

§ 371 (c)(1),
(2) Date: Nov. 30, 2022

(87) PCT Pub. No.: WO2021/245044

PCT Pub. Date: Dec. 9, 2021

(65) Prior Publication Data

US 2023/0287223 A1 Sep. 14, 2023

(30) Foreign Application Priority Data

Jun. 3, 2020 (EP) .................................... 20177987

(51) Int. Cl.

| | |
|---|---|
| ***C09D 5/03*** | (2006.01) |
| ***C08K 3/22*** | (2006.01) |
| ***C08K 3/36*** | (2006.01) |
| ***C08K 9/08*** | (2006.01) |
| ***C09D 7/62*** | (2018.01) |
| ***C09D 133/08*** | (2006.01) |
| ***C09D 167/02*** | (2006.01) |

(52) U.S. Cl.

CPC ................ *C09D 5/031* (2013.01); *C08K 3/22* (2013.01); *C08K 3/36* (2013.01); *C08K 9/08* (2013.01); *C09D 5/033* (2013.01); *C09D 7/62* (2018.01); *C09D 133/08* (2013.01); *C09D 167/02* (2013.01); *C08K 2003/2227* (2013.01); *C08K 2201/014* (2013.01)

(58) Field of Classification Search

None

See application file for complete search history.

(56) References Cited

U.S. PATENT DOCUMENTS

| | | | |
|---|---|---|---|
| 3,842,035 A | 10/1974 | Klaren | |
| 4,017,447 A | 4/1977 | Larsen et al. | |
| 5,110,846 A | 5/1992 | Farronato et al. | |
| 5,635,548 A | 6/1997 | Kittle et al. | |
| 5,714,206 A | 2/1998 | Daly et al. | |
| 5,741,602 A | 4/1998 | Hoppe et al. | |
| 5,811,158 A | 9/1998 | Yasuda et al. | |
| 5,856,378 A | 1/1999 | Ring et al. | |
| 5,898,043 A | 4/1999 | Uemae et al. | |
| 5,955,530 A | 9/1999 | Inoue et al. | |
| 6,080,823 A | 6/2000 | Kiriazis | |
| 6,121,408 A | 9/2000 | Aoki et al. | |
| 6,280,798 B1 | 8/2001 | Ring et al. | |
| 12,637,571 B2 | 5/2026 | Kittle et al. | |
| 2001/0005735 A1 | 6/2001 | Ring et al. | |
| 2001/0006993 A1 | 7/2001 | Ring et al. | |
| 2003/0017406 A1 * | 1/2003 | Gutman ............. | G03G 9/09775 430/108.7 |
| 2005/0175916 A1 | 8/2005 | Kittle | |
| 2006/0057390 A1 | 3/2006 | Kittle et al. | |
| 2006/0062929 A1 * | 3/2006 | Kittle .................... | B05C 19/025 427/475 |
| 2007/0160849 A1 | 7/2007 | Niggemann et al. | |
| 2016/0075885 A1 | 3/2016 | Ishizuka et al. | |
| 2023/0227665 A1 | 7/2023 | Kittle et al. | |
| 2023/0250299 A1 | 8/2023 | Kittle et al. | |
| 2023/0257592 A1 | 8/2023 | Kittle et al. | |

FOREIGN PATENT DOCUMENTS

| | | | |
|---|---|---|---|
| CN | 106243837 A | | 12/2016 |
| CN | 108148487 A | | 6/2018 |
| EP | 1477534 A2 | | 11/2004 |
| EP | 3165051 B1 | | 8/2018 |
| FR | 2289584 | | 5/1976 |
| GB | 2311527 | | 10/1997 |
| JP | 2002348528 A | * | 12/2002 |
| JP | 2008063521 | | 3/2008 |

(Continued)

OTHER PUBLICATIONS

JP 2002348528 translation (Year: 2002).*
"International Preliminary Report on Patentability," for PCT Application No. PCT/EP2021/064602 mailed Dec 6, 2022 (9 pages).
English Transalation of CN106243937A.
English Translation of CN108148487A.
English Translation of KR20170038557A.

(Continued)

*Primary Examiner* — Katarzyna I Kolb

(74) *Attorney, Agent, or Firm* — Pauly, De Vries Smith & Deffner LLC

(57) ABSTRACT

A one-component powder coating composition is provided, comprising a curing system comprising a curable resin and one or more curing additives for curing the curable resin, wherein the powder coating composition comprises one powder coating component comprising the curable resin and the one or more curing additives; and 0.5 to 25 wt % of a dry-blended inorganic particulate additive consisting of inorganic components i), ii), and iii), wherein component i) is non-coated aluminium oxide or non-coated silica, component ii) is aluminium hydroxide and/or aluminum oxyhydroxide, and component iii) is silica, and wherein the powder coating component has a particle size distribution with a Dv90 of at most 50 μm and a Dv50 of at most 30 μm.

14 Claims, No Drawings

(56) References Cited

FOREIGN PATENT DOCUMENTS

| | | | |
|---|---|---|---|
| KR | 20170038557 | A | 4/2017 |
| WO | 9411446 | | 5/1994 |
| WO | 9629372 | | 9/1996 |
| WO | 0001775 | | 1/2000 |
| WO | WO0001774 | A1 | 1/2000 |
| WO | 0159018 | | 8/2001 |
| WO | 02098577 | | 12/2002 |
| WO | 2004052557 | | 6/2004 |
| WO | 2010052296 | | 5/2010 |

OTHER PUBLICATIONS

European Search Report of Corresponding Application No. EP 20177987.3, dated Sep. 15, 2020.
International Search Report and Written Opinion of Corresponding Application No. PCT/EP2021/064602, mailed Aug. 9, 2021.
"Office Action," for United Arab Emirates Patent Application No. P6002529/22 mailed Dec 10, 2024 (7 pages).
"Non-Final Office Action," for U.S. Appl. No. 18/007,503 mailed Jul. 14, 2025 (26 pages).
"Response to Non-Final Rejection," mailed on Jul. 14, 2025, for U.S. Appl. No. 18/007,503, submitted via Patent Center on Oct. 9, 2025, 9 pages.
"Final Office Action," for U.S. Appl. No. 18/007,503 mailed Jan. 5, 2026 (20 pages).
"Notice of Allowance," for U.S. Appl. No. 18/007,503 mailed Jan. 27, 2026 (12 pages).
"Response to Final Office Action," for U.S. Appl. No. 18/007,503, filed Jan. 13, 2026 (7 pages).
"European Search Report," for European Patent Application No. 20177988.1 mailed Dec 14, 2020 (7 pages).
"Final Office Action," for U.S. Appl. No. 18/007,819 mailed Oct. 16, 2025 (12 pages).
"International Preliminary Report on Patentability," for PCT Application No. PCT/EP2021/064605 mailed Dec 6, 2022 (7 pages).
"International Search Report and Written Opinion," for PCT Application No. PCT/EP2021/054605 mailed Nov. 25, 2021 (12 pages).
"Non-Final Office Action," for U.S. Appl. No. 18/007,819 mailed Jun. 4, 2025 (15 pages).
"Non-Final Office Action," for U.S. Appl. No. 18/007,819 mailed Apr. 9, 2026 (17 pages).
"Notice of Allowance," for U.S. Appl. No. 18/007,819 mailed Aug. 19, 2026 (10 pages).
"Office Action," for United Arab Emirates Patent Application No. P6002523/2022 mailed Mar. 14, 2025 (5 pages).
"Response to Final Rejection," mailed on Oct. 16, 2025, for U.S. Appl. No. 18/007,819, submitted via Patent Center on Dec 5, 2025, (9 pages).
"Response to Non-Final Office Action," for U.S. Appl. No. 18/007,819, filed Aug. 3, 2026 (9 pages).
"Response to Non-Final Rejection," mailed on Jun. 4, 2025, for U.S. Appl. No. 18/007,819, submitted via EFS-Web on Sep. 22, 2025, (7 pages).

* cited by examiner

ONE-COMPONENT POWDER COATING COMPOSITION AND SUBSTRATE COATED WITH SUCH POWDER COATING COMPOSITION

CROSS-REFERENCE TO RELATED APPLICATIONS

This application is a 35 U.S.C. § 371 national phase application of PCT Application No. PCT/EP2021/064602 (WO 2021/245044 A1), filed on Jun. 1, 2021, which claims priority to EP Application Serial No. 20177987.3, filed on Jun. 3, 2020, each of which is incorporated herein by reference in its entirety.

FIELD OF THE INVENTION

The present invention relates to a one-component powder coating composition comprising a curing system comprising a curable resin and one or more curing additives for curing the curable resin, and to a substrate coated with such powder coating composition.

BACKGROUND OF THE INVENTION

Powder coating compositions are solid compositions that generally comprise a solid film-forming or binder polymer or mixtures of different solid film-forming polymers, usually with one or more pigments and, optionally, extenders and one or more performance additives such as plasticizers, stabilizers, degassing agents, and flow aids. The film-forming polymers are usually thermosetting polymers that cure upon heating, typically in the presence of a crosslinking agent, which may itself be a polymer. Generally, the polymers have a glass transition temperature (Tg), softening point or melting point above 30° C.

Conventionally, the manufacture of a powder coating composition comprises melt-mixing the components of the composition. Melt-mixing involves high speed, high intensity mixing of dry ingredients followed by heating of the mixture to a temperature above the softening temperature of the uncured polymer, but below the curing temperature, in a continuous compounder such as a single or twin-screw extruder to form a molten mixture. The extruded molten mixture is rolled into the shape of a sheet, cooled to solidify the mixture, and subsequently crushed to flakes and then pulverized to a fine powder. Generally, the powder is then subjected to a sequence of particle sizing and separation operations, such as grinding, classifying, sifting, screening, cyclone separation, sieving and filtering.

The thus-obtained powder coating composition is then applied to a substrate and heated to melt and fuse the particles and to cure the coating. Powder coating compositions may be applied by fluidized-bed processes wherein the substrate is preheated and dipped in a fluidized bed of the powder resulting in the powder fusing on contact with hot surface and adhering to the substrate, by electrostatic fluidized-bed processes, or by electrostatic spray processes wherein the powder coating particles are electrostatically charged by electrodes within a fluidized bed or by an electrostatic spray gun and directed to be deposited onto an earthed substrate.

Powder coating compositions are generally formulated as so-called one-component compositions prepared by melt-mixing all ingredients together. It is believed that melt-mixing all ingredients is needed in order to mix film-forming compounds (curable resin(s) and curing additives), pigments and performance additives in close proximity to each other so that they can coalescence and cure to form a coherent coating with integrity and the desired properties. Occasionally small amounts of solid additive, typically up to 1 wt %, are dry-mixed with the powder coating particles formed by melt-mixing, in particular to improve flowability (so-called dry flow agents).

Other particulate additives, for example matting agents such as silica, extenders, color pigments, biocidal pigments, and corrosion inhibiting pigments, are typically incorporated in the powder coating particles during melt-mixing. The particulate additive is therefore embedded in resin, which may negatively affect its functionality. The amount of particulate additive that can be added in a melt-mixing step is limited in view of processability. Moreover, a high amount of particulate additive would lead to unacceptably reduced surface flow during curing of the powder coating.

Since the amount of particulate matting agent, such as for example silica, that can be used in powder coating compositions is limited, gloss reduction in powder coatings is typically achieved by using two incompatible resins, for example an acrylic resin and a polyester resin, or two resins that generate incompatibility. Incompatibility can be generated by using resins that are initially miscible, but become incompatible during curing, for example because they differ in reactivity and thus in curing time. Materials that become incompatible during film formation can separate into different phase domains and therewith give rise to a matting effect. The use of two resins is, however, relatively expensive and is sensitive to variations in the extrusion process. Moreover, in powder coating compositions that need to cure at low temperature, two resins that differ in reactivity cannot be used since it would impede the ability to cure at a low temperature.

In WO 00/01774 is disclosed a powder coating composition comprising film-forming polymeric powder coating particles with a standard particle size distribution and, dry-blended therewith, at least one appearance-modifying additive and a further additive comprising wax-coated silica or consisting of alumina together with aluminium hydroxide. The appearance-modifying additive(s) in WO 00/01774 may be coloured polymeric material, a fine powder of polymeric material for gloss reduction, polymeric texturing additive(s), or mica pigments or other luster pigments.

There is a need for powder coating compositions that can provide coatings with different degrees of gloss appearance, including a matt appearance, whilst avoiding processability problems and other problems mentioned above.

SUMMARY OF THE INVENTION

It has now been found that the gloss appearance of a coating from a one-component power coating composition with relatively small particles can be tuned by adjusting the amount of a specific inorganic particulate additive that is dry-blended into the one-component power coating composition. Even a relatively high amount of the inorganic particulate additive can be dry blended into the one-component power coating composition to achieve a coating with a matt appearance, without negatively affecting the processability whilst still achieving a coherent film with desired film properties.

Accordingly, the invention provides in a first aspect a one-component powder coating composition comprising a curing system comprising a curable resin and one or more curing additives for curing the curable resin, wherein the powder coating composition comprises:

one powder coating component comprising the curable resin and the one or more curing additives; and in the range of from 0.5 to 25 wt % of a dry-blended inorganic particulate additive consisting of inorganic components i), ii), and iii), wherein component i) is non-coated aluminium oxide or non-coated silica, component ii) is aluminium hydroxide and/or aluminum oxyhydroxide, and component iii) is silica, and wherein, if component i) is non-coated silica, component iii) does not comprise non-coated silica, wherein the dry-blended inorganic particulate additive comprises a first and a second silica wherein the first silica is a surface-treated silica with a negative tribocharge, and the second silica is non-coated silica or is a surface-treated silica with a positive tribocharge wherein the wt % of the dry-blended inorganic particulate additive is based on the weight of the one powder coating component, and wherein the powder coating component has a particle size distribution with a Dv90 of at most 50 μm and a Dv50 of at most 30 μm, wherein Dv90 and Dv50 are determined by laser diffraction according to ISO 13320 using the Mie model.

It has been found that the presence of two different silicas with a different tribocharge provides a powder coating composition that is spray-stable over a broad concentration range of the dry-blended inorganic particulate additive. Since the concentration can be varied, the gloss appearance of the coating obtained can be varied whilst using the same inorganic particulate additive.

In a second aspect, the invention provides a substrate coated with a powder coating composition according to the first aspect of the invention.

DETAILED DESCRIPTION OF THE INVENTION

The powder coating composition according to the invention comprises a curing system comprising a curable resin and one or more curing additives for curing the curable resin.

Reference herein to a curing additive is to a compound that is needed for the curing of the curable resin, such as a curing agent that crosslinks with the curable resin, or that affects the speed of the curing reaction, such as a curing catalyst, a free-radical initiator such as a thermal radical initiator or a photo initiator, an accelerator, or an inhibitor. Reference herein to a curing catalyst is to a compound that catalyzes the cross-linking reaction between curable resin and a crosslinking curing agent, or, in case of a self-crosslinking curable resin, catalyzes the self-crosslinking reaction.

The one or more curing additives for curing the curable resin preferably comprise a curing agent that crosslinks with the curable resin and/or a curing catalyst. A crosslinking curing agent may be a resin in itself, such as for example an epoxy resin that crosslinks with a carboxyl-functional polyester resin or a polyamine resin that crosslinks with an epoxy resin. It will be appreciated that in case of a curing system with a curable resin and a curing agent that is a resin itself, any of the two resins can be considered the curable resin or the curing additive.

The powder coating composition is a one-component powder coating composition comprising one powder coating component comprising the curable resin and the one or more curing additives. The powder coating composition is thus free of any further powder coating component.

Reference herein to a powder coating component is to powder coating particles that are obtained by melt-mixing at least two powder coating ingredients in a compounder such as an extruder. Since a powder coating component is obtained by melt-mixing, it comprises a polymer that is able to soften, i.e. melt, in the compounder. This polymer may be the curable resin and/or a curing agent for the curable resin that is a resin in itself. A powder coating component optionally comprises further powder coating ingredients, such as for example pigment, extender, or performance additive(s), for example melt flow agent, degassing agent, or dispersing agent.

Since the powder coating composition of the invention is a one-component powder coating composition, the one powder coating component comprises all of the curable resin and of the one or more curing additives.

The powder coating component has small particles, i.e. smaller than standard particle size powder coating particles. The powder coating component has a particle size distribution with a $D_v90$ of at most 50 μm and a $D_v50$ of at most 30 μm, preferably with a $D_v90$ of at most 45 μm and a $D_v50$ of at most 25 μm, preferably at most 20 μm. For practical reasons, the $D_v90$ is preferably not lower than 3 μm and the $D_v50$ is preferably not lower than 1 μm.

$D_v90$ is the particle size value at which 90% of the total volume of particles has a particle size below that value. Accordingly, $D_v50$ is the particle size value at which 50% of the total volume of particles has a particle size below that value. Reference herein to $D_v90$ or $D_v50$ is to $D_v90$ or $D_v50$ as determined by laser diffraction according to ISO 13320 using the Mie model.

Preferably, the powder coating component has a particle size distribution such that the ratio between $D_v90$ and $D_v50$ is in the range of from 1.5 to 4.0.

In one embodiment, the particle size distribution of the powder coating component is such that $D_v90$ is at most 25 μm, preferably at most 20 μm, and $D_v50$ is at most 12 μm. Such small particles are generally obtained by jet-milling. It has been found that a powder coating composition with such small powder coating particles provides better aesthetics of the cured coating through better flow and levelling. Moreover, thinner films can be sprayed.

The curing system may be any curing system comprising a curable resin and one or more curing additives known to be suitable for powder coating compositions. Such curing systems are well known in the art.

Suitable curable resins are for example carboxyl-functional resins such as carboxyl-functional polyester, polyester-amide or (meth)acrylate-based resins; amine-functional resins such as polyamide or polyester-amide resins; hydroxyl-functional resins; epoxy or glycidyl-functional resins; anhydride-functional resins; and resins with unsaturated bonds such as unsaturated polyester.

Curing additives such as crosslinking curing agents or curing catalysts for curing such curable resins are well known in the art. Suitable curing additives for curing carboxyl-functional resins are for example β-hydroxyalkylamides or polyisocyanate, such as triglycidyl isocyanurate.

In one embodiment, the curable resin is carboxyl-functional polyester or carboxyl-functional polyacrylate, preferably carboxyl-functional polyester, and the one or more curing additives comprise a crosslinking agent, preferably a β-hydroxyalkylamide or a polyisocyanate, preferably triglycidyl isocyanurate. Preferably, the curable resin is carboxyl-functional polyester and the one or more curing additives comprise a β-hydroxyalkylamide as crosslinking agent.

In other embodiments, the curing system may suitably be an epoxy-polyester system or an epoxy-amine system. In an epoxy-polyester curing system, the one or more curing additives is an epoxy resin and the curable resin is a polyester resin with crosslinkable functional groups. The epoxy resin crosslinks with the functional groups on the polyester resin. In an epoxy-amine curing system, the one or more curing additives is a polyamine resin and the curable resin is an epoxy resin. The polyamine resin acts as curing agent that crosslinks the epoxy resin.

It is an advantage of the powder coating composition according to the present disclosure that the gloss level of the coating obtained can be tuned. A low gloss coating can be obtained, even with a powder coating composition that cures at low temperature. Gloss reduction in powder coatings is typically achieved by using two incompatible resins or two resins that become incompatible during curing, for example because they differ in reactivity and thus in curing time. In a curing system that cures at low temperature, the resin has high reactivity. Combining such resin with a resin with lower reactivity would impede the ability to cure at a low temperature. With the powder coating composition according to the present disclosure, a matt coating can be obtained without the need to use curable resins that differ in reactivity.

In one embodiment therefore, the curing system is capable of curing at a temperature below 160° C., preferably below 140° C. Such curing systems are well-known in the art.

The powder coating composition comprises in the range of from 0.5 to 25 wt %, preferably of from 0.8 to 20 wt %, more preferably of from 1.0 to 15 wt %, of a dry-blended inorganic particulate additive. The dry-blended inorganic particulate additive consists of inorganic components i), ii), and iii), wherein:

component i) is non-coated aluminium oxide or non-coated silica;

component ii) is aluminium hydroxide and/or aluminum oxyhydroxide; and component iii) is silica.

If component i) is non-coated silica, component iii) does not comprise non-coated silica. The dry-blended inorganic particulate additive comprises a first silica and a second silica wherein the first silica is a surface-treated silica with a negative tribocharge, and the second silica is non-coated silica or is a surface-treated silica with a positive tribocharge.

Thus, if component i) is non-coated aluminium oxide, component iii) comprises the first silica and the second silica. If component i) is non-coated silica, component iii) comprises a surface-treated silica with a negative tribocharge. Preferably, component iii) comprises the first silica and the second silica.

Reference herein to a silica with a negative tribocharge is to a silica that imparts a negative electric charge on a powder coating particle when mixed with it, due to particle-particle contact (so-called triboelectric charging). Reference herein to a silica with a positive tribocharge is to a silica that imparts a positive electric charge on a powder coating particle when mixed with it. The charge that a silica will impart on a powder coating particle can be determined by mixing the silica with particles of the powder coating component and then determining on which electrode (negative or positive) the mixture preferentially deposits.

It has been found that by controlling the amount of the dry-blended inorganic particulate additive, the gloss level of the coating obtained can be tuned. The amount of the dry-blended inorganic particulate additive needed to obtain a specific gloss level strongly depends on the specific surface area and thus on the particle size of the powder coating particles. Coverage of powder coating particles by inorganic particles will result in matting of the coating. The smaller the particles, the larger the surface area and therewith the larger the amount of the dry-blended additive needed for a matt appearance. For any particle size distribution of the powder coating component, the amount of the dry-blended inorganic particulate additive, more in particular the amount of silica, will determine the gloss level of the coating obtained. It is an advantage of the coating composition according to the present disclosure that the degree of matting can be tuned by controlling the amount of the dry-blended inorganic particulate additive.

In case the powder coating component has a $D_v90$ of 25 μm or lower and a $D_v50$ of 12 μm or lower, the amount of the dry-blended additive may be up to 25 wt %, whilst still obtaining a coating with good surface appearance and good coating integrity. If the powder coating component has a $D_v90$ of 25 μm or lower and a $D_v50$ of 12 μm or lower, the amount of the dry-blended inorganic particulate additive for a matt coating is preferably at least 3.0 wt %, more preferably in the range of from 5.0 to 25 wt %, even more preferably of from 8.0 to 20 wt %.

In case the powder coating component has a $D_v90$ in the range of from above 25 to 50 μm and a $D_v50$ in the range of from above 12 to 30 μm, the amount of dry-blended inorganic particulate additive may be as low as 0.5 wt %, preferably is in the range of from 0.5 to 10 wt %, more preferably of from 1.0 to 8.0 wt %, even more preferably of from 1.2 to 5.0 wt %.

Any reference herein to the wt % of the dry-blended inorganic particulate additive is to the wt % based on the weight of the one powder coating component.

The inorganic particulate additive is dry-blended with the one powder coating component. The inorganic particulate additive may be dry-blended with the powder coating component as a mixture of inorganic components i), ii) and iii), or as separate inorganic components. Preferably, at least components i) and ii) are premixed before dry-blending the inorganic particulate additive with the powder coating component. Inorganic component iii) may be at least partly pre-mixed with inorganic components i) and ii) before dry-blending with the powder coating component or may be dry-blended separately with the powder coating component.

The inorganic particulate additive—(partly) pre-mixed or as separate inorganic components i), ii) and iii)—may be dry-blended with the powder coating component in any suitable way, for example by:

injecting the particulate additive to the powder components at the mill where extruded melt-mixed powder component is milled to the desired particle size;

adding the particulate additive to the powder component at the stage of sieving after milling;

post-adding the particulate additive to the powder coating component in a powder tumbler, such as for example a Turbula® mixer, or other suitable mixing device.

Preferably, the particulate additive is post-added to the powder coating component in a powder tumbler or other suitable mixing device.

Without wishing to be bound to any theory, it is believed that the dry-blended inorganic particulate additive controls the charge of the powder coating component and of the silica in the additive, and therewith helps providing a stable and evenly distributed arrangement of silica and powder coating components particles, so that both types of particles can be evenly sprayed and result in a coating with a consistent and even gloss level appearance.

Inorganic component (i) has a discharging function and is capable of exchanging electrons with the powder coating particles. It has Lewis acid and Lewis base sites at its surface so that it can accept and donate electrons. In order to have such discharging properties, inorganic component (i) is non-coated.

Inorganic component i) may be aluminium oxide or non-coated silica. Aluminium oxide is preferred, but in powder coating applications wherein aluminium oxide is undesired, for example for coatings that are in direct contact with drinking water such as coatings for inner surfaces of drinking water tubes, non-coated silica may be used instead. If inorganic component i) is aluminium oxide, it is preferably crystalline aluminium oxide. Any structural form (polymorph) of aluminium oxide may be used. Gamma-aluminium oxide, optionally in combination with delta-aluminium oxide, is particularly preferred.

If component i) is non-coated silica, it may be any type of non-coated silica, for example fumed silica (also referred to as pyrogenic silica), micronized amorphous silica (commercially available as Syloid® from Grace), precipitated silica, mixed metal-silicon oxides, and naturally occurring silica such as for example diatomaceous earth. Preferably, the silica is amorphous silica. Micronized amorphous silica is particularly preferred.

Inorganic component ii) is aluminium hydroxide and/or aluminum oxyhydroxide, preferably crystalline aluminium hydroxide and/or aluminum oxyhydroxide. Any structural form (polymorph) of aluminium hydroxide or aluminum oxyhydroxide may be used, such as alpha-aluminum oxyhydroxide, alpha-aluminium hydroxide, gamma-aluminum oxyhydroxide, or gamma-aluminium hydroxide, preferably gamma-aluminum oxyhydroxide or gamma-aluminium hydroxide. Inorganic component ii) may be surface-treated (coated) to prevent caking of the component. Inorganic component ii) helps dispersing the other inorganic components in the dry-blended additive. It also has a buffering function in the sense that component ii) makes the functioning of inorganic components i) and iii) less sensitive to concentration.

Inorganic component iii) is silica. Any type of silica may be used, including fumed silica (also referred to as pyrogenic silica), precipitated silica, micronized amorphous silica, mixed metal-silicon oxides, and naturally occurring silica such as for example diatomaceous earth. Preferably, the silica is amorphous silica.

The dry-blended inorganic particulate additive comprises a first and a second silica that are different: the first silica is a surface-treated silica with a negative tribocharge and the second silica is a silica with a positive tribocharge. The second silica is non-coated silica or a surface-treated silica with a positive tribocharge. Thus, if component i) is non-coated aluminium oxide (and thus does not comprise non-coated silica), component iii) comprises the first and the second silica as specified. If component i) is non-coated silica, component iii) comprises a surface-treated silica with a negative tribocharge. Inorganic component iii) thus comprises or consists of a coated silica with a negative tribocharge. A negative tribocharge can for example be given by treating the silica surface with an organosilane such as dimethyldichlorosilane, hexamethyldisilazane, polydimethylsiloxane, or mixtures thereof.

In the embodiment wherein component i) is aluminium oxide, component iii) further comprises a silica with a positive tribocharge. The silica with a positive tribocharge is either a non-coated silica or a surface-treated silica. A positive tribocharge can for example be given by treating the silica surface with an organosilane with amino or ammonium end groups.

Surface-treated fumed silicas with a negative or positive tribocharge are commercially available, for example from the HDK® fumed silica range ex. Wacker Chemie AG. Tribocharge can be determined by blowing silica particles off iron carrier particles in a q/m meter (ex. Epping GmbH, Germany).

The dry-blended inorganic particulate additive may comprise wax-coated silica. Wax-coated silica is not considered a silica with a negative or positive tribocharge. Preferably the powder coating composition is free of any wax-coated silica.

A combination of a surface-treated silica with a negative tribocharge and non-coated silica or a surface-treated silica with a positive tribocharge is believed to balance the charge of the powder coating particles, either by the silica wrapping powder coating particles or by tribocharging powder coating particles through particle-particle contact between silica particles and powder coating particles.

The weight ratio of the first and the second silica is preferably in the range of from 10:90 to 90:10, more preferably of from 20:80 to 80:20, even more preferably of from 30:70 to 70:30, still more preferably of from 40:60 to 60:40.

The terms coated and surface-treated in connection with inorganic particles are used herein interchangeably.

If component i) is aluminium oxide, the $D_v50$ of the aluminium oxide particles is preferably at most 0.2 μm. The $D_v50$ of the aluminium hydroxide and/or aluminum oxyhydroxide particles in inorganic component ii) is preferably in the range of from 0.5 to 3.0 μm, more preferably of from 0.9 to 2.5 μm.

The $D_v50$ of the silica in inorganic component iii) and, if present, in component i) is preferably at most 20 μm, more preferably in the range of from 0.01 to 15 μm.

To avoid undesired electrostatic phenomena, the powder coating composition generally does not comprise more than 1.0 wt % of aluminium oxide, based on the total weight of the composition. Preferably, the amount of aluminium oxide is in the range of from 0.01 to 0.4 wt %. The amount of component ii) in the powder coating composition generally does not exceed 5.0 wt %, based on the total weight of the composition. Preferably, the amount of component ii) is in the range of from 0.01 to 3 wt %, more preferably of from 0.02 to 1 wt %. In case inorganic component i) is aluminium oxide, the weight ratio of inorganic components i) and ii) in the dry-blended additive is preferably in the range of from 1:99 to 80:20, more preferably of from 10:90 to 60:40, even more preferably of from 20:80 to 50:50.

The percentage of component iii) in the dry-blended inorganic particulate additive may suitable be in in the range of from 5 to 99 wt %. If very matt coatings are desired, the percentage of component iii) in the dry-blended inorganic particulate additive is preferably in the range of from 50 to 99 wt %, more preferably of from 60 to 98 wt %.

The powder coating composition may comprise a further dry-blended inorganic particulate additive that does not comprise any of aluminium oxide, silica, aluminium hydroxide or aluminum oxyhydroxide. The total amount of dry-blended inorganic particulate additives in the powder coating composition should not exceed 40 wt %, preferably does not exceed 35 wt %, more preferably does not exceed 30 wt %, based on the weight of the powder coating component without dry-blended additive(s).

Such further dry-blended inorganic particulate additive may be any inorganic additive that may provide functionality to the powder coating composition, for example inorganic color pigment, inorganic pigment with metallic effect, biocidal pigment, anticorrosive pigment, extenders, opacifying pigment, conductive or anti-static pigment, infrared-absorbing pigment, radiation shielding pigment, glass flake, abrasion resistance agent, or any combination of two or more thereof.

In one embodiment, the powder coating composition is free of any pigment with metallic effect.

Preferably the coating composition is free of any further dry-blended additive. If free of any further dry-blended additive, the coating composition consists of the one powder coating component and the dry-blended inorganic particulate additive with inorganic components i), ii), and iii).

In a second aspect, the invention provides a substrate coated with a powder coating composition according to the first aspect of the invention.

The substrate may be any substrate suitable for powder coating, for example a metal substrate. If the powder coating composition is a composition that cures at a relatively low temperature, i.e. at or below 140° C., the substrate may be a substrate that cannot be exposed to high curing temperatures, such as wood, engineered wood, or plastic.

Prior to applying the powder coating composition according to the invention, the substrate surface may be treated by a surface treatment to remove any contaminants and/or to improve corrosion resistance of the substrate. Such surface treatments are well known in the art and commonly applied to surfaces to be coated with powder coatings.

The powder coating composition according to the invention may be applied as a topcoat over a first layer of powder coating composition. The first layer may then be a powder coating composition not according to the invention. Thus, in one embodiment, the substrate is coated with a first layer of powder coating composition and is then coated with a top layer of the powder coating composition according to the first aspect of the invention.

Due to the relatively small particle size of the powder coating components, the powder coating composition of the present disclosure can be applied in a relatively thin layer. It has been found that even if applied in a thin layer, a coating with integrity and a consistent and even matt appearance is obtained.

The powder coating composition can be applied with any application technique known in the art, such as fluid bed application or spray application, preferably spray application with a corona gun.

The invention is further illustrated by means of the following non-limiting examples.

EXAMPLES

In Table 1, the compositions of the dry-blended additives used in the Examples are shown.

TABLE 1

Dry-blended additives used in the Examples (ingredients in wt %)

| | | Dry-blended additive composition (wt %) | | | | | | | | | |
|---|---|---|---|---|---|---|---|---|---|---|---|
| ingredient | | 1 | 2 | 3 | 4 | 5 | 6 | 7 | 8 | 9 | 10 |
| Aluminium oxide[a] | i) | 20 | 14 | 20 | 20 | 3.3 | 1.8 | 2 | 6.7 | 6.7 | 10 |
| Aluminium hydroxide[b] | ii) | 60 | 56 | 60 | 60 | 10.0 | 5.5 | 6 | 20 | 20 | 30 |
| Coated fumed silica (negative tribocharge)[c] | iii) | 20 | | | | 86.7 | 92.7 | 42 | 73.3 | 40 | 60 |
| Non-coated silica (positive tribocharge) [d] | iii) | | | 10 | | | | 50 | | | |
| Coated fumed silica (positive tribocharge) [e] | iii) | | 30 | 10 | | | | | | 33.3 | |
| Wax-treated silica[f] | | | | | 20 | | | | | | |

[a]AEROXIDE ® Alu C: fumed aluminium oxide; no surface treatment (non-coated).
[b]MARTINAL OL 107C: surface-treated aluminium hydroxide.
[c]HDK ® H3004 (ex. Wacker): fumed silica, surface-treated with hexamethyldisilazane; Dv50 < 20 μm.
[d] Syloid ® C811 (ex. Grace): micronized amorphous porous silica; no surface treatment; average particle size 11 μm.
[e] HDK ® H2150VP (ex. Wacker): fumed silica, surface-treated with organosilane with amino and ammonium end groups to give it a positive tribocharge; Dv50 < 20 μm.
[f]Acematt OK520 wax-treated silica A powder coating component was prepared by melt-mixing all ingredients as indicated in Table 2 in an extruder. A part of the extruded powder coating component was milled and sieved to a standard particle size distribution ($D_v90$ of 110 μm and a $D_v50$ of 35 μm), another part was milled and sieved to a particle size distribution with a $D_v90$ of 40 μm and $D_v50$ of 15 μm, and a further part was jet-milled and sieved to obtain a particle size distribution with a $D_v90$ of 20 μm and a $D_v50$ of 8 μm.

TABLE 2

Powder coating component

| | wt % |
|---|---|
| Carboxyl-functional polyester | 90 |
| Hydroxyalkylamide crosslinker[1] | 3.8 |
| benzoin (degassing agent) | 0.4 |
| melt flow agent[2] | 1.3 |
| Blue pigment[3] | 4.5 |

[1]Primid XL-552
[2]BYK-LP G21191
[3]Irgalite ® Blue PG (PB 15:3)

Examples 1-13

Powder coating compositions were prepared by dry-blending one of additives 1 to 10 with the powder coating component in the amounts given in Table 3 (wt % based on the total weight of the powder coating component) in a Turbula powder mixer for 30 minutes. Comparison powder coating compositions 11 and 12 had no dry-blended additive. A further comparison powder coating composition 13 was prepared by dry-blending 5 wt % of additive 7 to the powder coating component with a standard particle size distribution.

Powder coating compositions 5 to 7 and comparison powder coating compositions 12 and 13 were spray-applied with a corona spray gun on a metal panel. The sprayed coatings of powder coating compositions 5 to 7 had a film thickness of 10 μm; the sprayed coatings of powder coating composition 12 had a film thickness of 35 μm.

Powder coating composition 11 could not be sprayed due to poor fluidity of the powder and therefore a sample of composition 11 was melted on a hot plate at 200° C. for 15 minutes. The spray coated panels were cured in a convention oven at 200° C. for 15 minutes.

In order to test spray stability, powder coating compositions 1a, 1b, 2a, 2b, 3a-c, 4a, 4b, 8a, 8b, 9a, 9b, 10a, and 10b were spray applied using a corona gun to two electrodes: one at +30 kV and the other at −30 kV. The two electrodes were cured in a convection oven at 200° C. for 15 minutes.

The gloss of the cured coatings on the metal panels and on the electrodes was measured by light reflection at an angle of 60° using a glossmeter from Rhopoint Instruments. The gloss level (in gloss units (GU)) is given in Table 3. Powder coating composition 13 sintered and did not flow into a film when heated for curing. The coating fell off the metal panel and gloss could therefore not be determined.

Coating compositions 1a, 2a, 3a-3c, 4a, 5 to 7, 8a, 9a, 9b, 10a, and 12 all had fully flowed and leveled, and an integral polymer film was obtained with consistent gloss appearance for the entire panel or electrode surface. The silica had fully bonded; it could not be removed by rubbing with methyl ethyl ketone.

The results indicate that dry-blended additives 3, 7, and 9, all with a two types of silica of which one imparts negative tribocharge and the other positive tribocharge to the powder coating particles, can be used in various amounts to tune the gloss level of the resulting coating, whilst providing a spray-stable powder coating compositions at all concentrations of the dry-blended additive. The powder coating compositions with a dry-blended additive with a single silica (additives 1, 2, 4, 8, and 10) were not spray-stable for all concentrations of the additive. The small particle size powder coating compositions 5, 6, and 7 were difficult to spray when a dry-blended additive with a single silica was used (compositions 5 and 6) and could be evenly sprayed if a dry-blended additive with two types of silica was used (composition 7).

TABLE 3

Powder coating compositions

| powder coating comp. | $D_v90$; $D_v50$ (μm) | additive | amount of additive | gloss at 60° (GU) | comment |
|---|---|---|---|---|---|
| 1a* | 40; 15 | 1 | 0.3 wt % | 85 | |
| 1b* | 40; 15 | 1 | 1 wt % | n.d. | Separation upon spraying |
| 2a* | 40; 15 | 2 | 1 wt % | 75 | |
| 2b* | 40; 15 | 2 | 3 wt % | n.d. | Separation upon spraying |
| 3a | 40; 15 | 3 | 2 wt % | 70 | |
| 3b | 40; 15 | 3 | 4 wt % | 65 | |
| 3c | 40; 15 | 3 | 6 wt % | 25 | |
| 4a* | 40; 15 | 4 | 1 wt % | 80 | |
| 4b* | 40; 15 | 4 | 6 wt % | 67 on − electrode; 7 on + electrode | Separation upon spraying |
| 5* | 20; 8 | 5 | 6 wt % | 40 | Powder coating sticks to glass wall of Turbula mixer. Uneven, inconsistent spraying with pulsing and surging |
| 6* | 20; 8 | 6 | 11 wt % | 10 | Powder coating sticks to glass wall of Turbula mixer. Uneven, inconsistent spraying with pulsing and surging |
| 7 | 20; 8 | 7 | 10 wt % | 5 | No sticking to glass wall of Turbula mixer. Even and consistent spraying. |
| 8a* | 40; 15 | 8 | 3 wt % | 1 | |
| 8b* | 40; 15 | 8 | 1.5 wt % | 20 on − electrode; 7 on + electrode | Separation upon spraying |
| 9a | 40; 15 | 9 | 3 wt % | 5 | |
| 9b | 40; 15 | 9 | 1.5 wt % | 35 | |
| 10a* | 40; 15 | 10 | 2 wt % | 5 | |
| 10b* | 40; 15 | 10 | 1 wt % | 34 on − electrode; 14 on + electrode | Separation upon spraying |
| 11* | 20; 8 | none | — | 90 | Not sprayable |
| 12* | 40; 15 | none | — | 90 | |
| 13* | 110; 35 | 7 | 5 wt % | | Sintering; gloss measurement not possible |

*comparison powder coating composition
n.d.: not determined

The invention claimed is:

1. A one-component powder coating composition comprising a curing system comprising a curable resin and one or more curing additives for curing the curable resin, wherein the powder coating composition comprises:

one powder coating component comprising the curable resin and the one or more curing additives; and 0.5 to 25 wt % of a dry-blended inorganic particulate additive consisting of inorganic components i), ii), and iii), wherein component i) is non-coated aluminium oxide or non-coated silica, component ii) is aluminium hydroxide and/or aluminum oxyhydroxide, and component iii) is silica, and wherein, if component i) is non-coated silica, component iii) does not comprise non-coated silica, wherein silica component of the dry-blended inorganic particulate additive comprises a first and a second silica wherein the first silica is a surface-treated silica with a negative tribocharge, and the second silica is non-coated silica or is a surface-treated silica with a positive tribocharge, wherein the wt % of the dry-blended inorganic particulate additive is based on the weight of the one powder coating component, and wherein the one powder coating component has a particle size distribution with a Dv90 of at most 50 μm and a D 50 of at most 30 μm, wherein Dv90 and D 50 are determined by laser diffraction according to ISO 13320 using the Mie model.

2. The powder coating composition according to claim 1, wherein the dry-blended inorganic particulate additive comprises 50 to 99 wt % of inorganic component iii), based on the weight of the dry-blended inorganic particulate additive.

3. The powder coating composition according to claim 1, wherein inorganic component i) is aluminium oxide, and the weight ratio of inorganic components i) and ii) in the dry-blended additive is in the range of from 10:90 to 60:40.

4. The powder coating composition according to claim 1, wherein the one powder coating component has a particle size distribution such that $D_v90$ is at most 45 μm and $D_v50$ is at most 25 μm.

5. The powder coating composition according to claim 1, wherein the one powder coating component has a particle size distribution such that $D_v90$ is at most 25 μm and $D_v50$ is at most 12 μm.

6. The powder coating composition according to claim 5, wherein the powder coating composition comprises 5.0 to 25 wt % of the dry-blended inorganic particulate additive, based on the weight of the one powder coating component.

7. The powder coating composition according to claim 1, wherein the one powder coating component has a particle size distribution such that $D_v90$ is in the range of from above 25 to 50 μm and $D_v50$ is in the range of from above 12 to 30 μm, wherein the powder coating composition comprises 0.5 to 10.0 wt % of the dry-blended particulate additive, based on the weight of the one powder coating component.

8. The powder coating composition according to claim 1, wherein the powder coating composition is free of wax-coated silica.

9. The powder coating composition according to claim 1, wherein the weight ratio of the first silica and the second silica is in the range of from 10:90 to 90:10.

10. The powder coating composition according to claim 9, wherein the weight ratio of the first silica and the second silica is in the range of from 30:70 to 70:30.

11. The powder coating composition according to claim 1, wherein the curable resin is a carboxyl-functional polyester or carboxyl-functional polyacrylate and the one or more curing additives comprise a crosslinking agent.

12. The powder coating composition according to claim 1, wherein the curing system is capable of curing at a temperature below 160° C.

13. A substrate coated with a powder coating composition according to claim 1.

14. The substrate according to claim 13, wherein the substrate is coated with a first layer of powder coating composition and is then coated with a top layer of the powder coating composition according to claim 1.

* * * * *